US011629802B2

United States Patent
Koenig et al.

(10) Patent No.: US 11,629,802 B2
(45) Date of Patent: Apr. 18, 2023

(54) CUTTING RING FITTING

(71) Applicant: Walter Stauffenberg GmbH & Co. KG, Werdohl (DE)

(72) Inventors: Ulrich Stefan Koenig, Herscheid (DE); Alexander Aul, Unna (DE); Sergej Bernikov, Luedenscheid (DE)

(73) Assignee: Walter Stauffenberg GmbH & Co. KG, Werdohl (DE)

( * ) Notice: Subject to any disclaimer, the term of this patent is extended or adjusted under 35 U.S.C. 154(b) by 185 days.

(21) Appl. No.: 17/050,529

(22) PCT Filed: Feb. 18, 2019

(86) PCT No.: PCT/EP2019/053963
§ 371 (c)(1),
(2) Date: Oct. 26, 2020

(87) PCT Pub. No.: WO2019/206492
PCT Pub. Date: Oct. 31, 2019

(65) Prior Publication Data
US 2021/0239242 A1  Aug. 5, 2021

(30) Foreign Application Priority Data
Apr. 27, 2018 (EP) .................... 18169967

(51) Int. Cl.
*F16L 19/10* (2006.01)
*F16L 19/08* (2006.01)

(52) U.S. Cl.
CPC .............. *F16L 19/10* (2013.01); *F16L 19/083* (2013.01)

(58) Field of Classification Search
CPC ........ F16L 19/10; F16L 19/045; F16L 19/083
USPC ....................................... 285/382.7
See application file for complete search history.

(56) References Cited

U.S. PATENT DOCUMENTS

| 2,566,769 | A |   | 9/1951 | Kay |   |
|---|---|---|---|---|---|
| 3,368,831 | A | * | 2/1968 | Phillipps | F16L 19/10 285/382.7 |
| 2009/0224536 | A1 | * | 9/2009 | Fukushima | F16L 19/045 |
| 2010/0059995 | A1 | * | 3/2010 | Ciprich | F16L 19/10 |

FOREIGN PATENT DOCUMENTS

| DE | 28 33 587 A1 | 2/1980 |
| DE | 91 14 824 U1 | 2/1992 |

(Continued)

OTHER PUBLICATIONS

English translation of EN ISO 1127, "Stainless steel tubes—Dimensions, tolerances and conventional masses per unit length (ISO 1127:1992)", DIN Deutsches Institut für Normung e. V. (German Institute for Standardization), Mar. 2019 (12 pages).

(Continued)

*Primary Examiner* — Zachary T Dragicevich
(74) *Attorney, Agent, or Firm* — Collard & Roe, P.C.

(57) ABSTRACT

A cutting ring fitting for a thin-walled pipe, includes: a connecting body having a tapered cone; a cutting ring; a union nut which can be screwed onto the connecting body; and a reinforcing sleeve for insertion into the pipe, the reinforcing sleeve having an axial slot. A pipe includes such a cutting ring fitting, and a method mounts such a cutting ring fitting on a thin-walled pipe.

9 Claims, 3 Drawing Sheets

(56) References Cited

FOREIGN PATENT DOCUMENTS

EP 2 453 156 A2 5/2012
JP H05-180380 A 7/1993

OTHER PUBLICATIONS

English translation of DIN EN 10217-7, "Welded steel tubes for pressure purposes—Technical delivery conditions—Part 7: Stainless steel tubes", DIN Deutsches Institut für Normung e. V., Jan. 2015 (38 pages).
International Search Report in PCT/EP2019/053963, dated Apr. 24, 2019.
Notification Concerning Transmittal of International Preliminary Report on Patentability with attached English translation of International Preliminary Report on Patentability and Written Opinion of the International Searching Authority in PCT/EP2019/053963, dated Nov. 5, 2020.

* cited by examiner

CUTTING RING FITTING

CROSS REFERENCE TO RELATED APPLICATIONS

This application is the National Stage of PCT/EP2019/053963 filed on Feb. 18, 2019, which claims priority under 35 U.S.C. § 119 of European Application No. 18169967.9 filed on Apr. 27, 2018, the disclosure of which is incorporated by reference. The international application under PCT article 21(2) was not published in English.

BACKGROUND OF THE INVENTION

1. Field of the Invention

The invention relates to a cutting ring screw fitting for a thin-walled pipe. The invention furthermore relates to a pipe having such a cutting ring screw fitting, as well as to a method for mounting of a cutting ring screw fitting.

2. Description of the Related Art

Cutting ring screw fittings are used, in particular, in the sector of hydraulics, and allow pipes to be screwed together using connecting bodies. For this purpose, a pipeline, in particular a metallic pipeline, is connected with a connecting body having an accommodation opening for the pipeline. The connecting body has an outer thread for screwing a union nut onto it. A cutting ring is disposed between the connecting body and the union nut. When the union nut is tightened, the cutting ring, which is provided with a cutting edge, is pressed into the inside cone of the connecting body. During this process, the cutting ring narrows in its front part and cuts into the mantle of the pipe end. The material raised up during this process forms a collar in front of the cutting edge, which brings about the result that the pipe end is held firmly and tightly on the connecting body.

Thin-walled metal pipes or also plastic pipes are particularly problematic for such cutting ring screw fittings, since these can deform at the forces that act on the connecting body when the union nut is screwed on. In order to counteract such deformation, a reinforcement sleeve is usually used to stabilize the connection point, as is mentioned, for example, in DE 91 14 824 U1. This method of procedure has proven itself for decades. Nevertheless, achieving the required connection quality proves to be problematic, in particular in the case of those cutting ring screw fittings in which thin-walled metal pipes are put in place using such reinforcement sleeves.

SUMMARY OF THE INVENTION

This is where the present invention takes its start. The invention is based on the task of making available a cutting ring screw fitting, in particular for thin-walled metal pipes as well as plastic pipes, the reliability of which fitting is improved. This task is accomplished with a cutting ring screw fitting having the characteristics according to the invention.

With the invention, a cutting ring screw fitting for thin-walled metal pipes as well as pipes made of plastic is made available, the reliability of which fitting is improved. Surprisingly, it was found that achieving the required connection quality is particularly problematic in the case of those cutting ring screw fittings where pipes are used, in the case of which pipes the tolerance values that are permissible with reference to the nominal inside diameter are taken advantage of, for the most part. The pipes are produced according to DIN EN 10217-7 in the current version January 2015. In the present case, here, in particular, the tolerance class D3/T3 in the diameter range (outside diameter) of 6-42 deserves particular attention. In this regard, the tolerance class is referenced to EN ISO 1127. This results in permissible deviations of the outside diameter (D3) of +/−0.3 mm or +/−0.75%, as well as permissible deviations of the wall thickness (T3) of +/−0.2 mm or +/−10%, with the higher value being permissible, in each instance.

It was found, in this regard, that due to existing tolerances, undesired distances between the outside mantle surface of the reinforcement sleeve and the inner mantle surface of the pipe come about, and thereby the connection quality between cutting ring and pipe is negatively impaired. According to the invention, a reinforcement sleeve that is provided with an axial slot is now used. In this regard, the reinforcement sleeve preferably has a greater outside diameter than the pipe inside diameter. Due to the slot, the reinforcement sleeve is able to equalize tolerances within the pipe inside diameter. Due to the slot, the outside diameter of the sleeve can be reduced to such an extent that the sleeve can be introduced into the pipe under a preload, and afterward, the sleeve lies against the inner mantle surface of the pipe due to this preload. An optimal, uniform preload over the outer mantle surface of the reinforcement sleeve is achieved if the axial slot runs over the entire length of the reinforcement sleeve. The axial slot can have not only straight delimitation edges but also wave-shaped, zigzag-shaped, curved, trapezoid-shaped or other suitable delimitation edges. Preferably, the delimitation edges have an essentially constant distance from one another, so that a uniform slot width is achieved.

It has been shown that a preload of the reinforcement sleeve of three percent is sufficient to equalize inside diameter tolerances of a thin-walled pipe that is used. For this reason, the outside diameter $D_{sleeve}$ of the reinforcement sleeve preferably amounts to $1.03 \cdot d_{i,nom}$, where $d_{i,nom}$=nominal pipe inside diameter. The width of the axial slot $b_{slot}$ of the reinforcement sleeve is calculated, particularly preferably, to be $b_{slot} = D_{sleeve} \cdot 3\% \cdot \pi$. As a result, a sufficient preload to equalize inside diameter tolerances of the pipe is achieved, along with simultaneous maximal stability. At this point, the maximal tolerance of the nominal inside diameter of the pipe is understood to be the distance between a nominal inside diameter with maximum plus tolerance and with maximum minus tolerance.

In a further development of the invention, the reinforcement sleeve is provided, at its end, with a collar that runs around the circumference, at least in certain regions, on an end face of the pipe. As a result, uniform axial positioning of the reinforcement sleeve in the pipe is achieved.

In a further embodiment of the invention, the reinforcement sleeve has a cone-shaped end section at one end. As a result, introduction of the reinforcement sleeve into the pipe end is facilitated. Preferably, the reinforcement sleeve is produced from brass or spring steel. In an embodiment made of spring steel, this steel should be heat-treated, so as to increase the preload force.

Furthermore, a pipe having a cutting ring screw fitting of the aforementioned type, having the characteristics of another aspect of the invention, is an object of the present invention. A reinforcement sleeve having an axial slot is introduced into the pipe, which sleeve lies against the inside wall of the pipe with a preload. In this way, tolerances within the inside diameter of the pipe are equalized, and thereby forces that act on the pipe in the region of the connection location are uniformly absorbed by the reinforcement sleeve. Preferably, the width of the axial slot is calculated to be $b_{slot}=D_{sleeve}\cdot 3\%\cdot\pi$, where $D_{sleeve}$=outside diameter of the reinforcement sleeve.

The invention is furthermore based on the task of making available a method for mounting a cutting ring screw fitting on a thin-walled pipe, which method allows reliable connection of the pipe with a connecting body. According to the invention, this This task is accomplished by means of a method having the characteristics of another aspect of the invention. In this regard, it is essential to the invention that first, an axially slotted reinforcement sleeve, the outside diameter of which sleeve is greater than the pipe inside diameter, and which sleeve has a collar, on the end face, that runs circumferentially at least in certain sections, is compressed, and subsequently, the reinforcement sleeve that has been preloaded in this way, so as to reduce its outside diameter, is inserted into the pipe until the end face of the pipe lies against the collar of the reinforcement sleeve, and afterward, the reinforcement sleeve is relaxed until its outer mantle surface lies against the inner wall of the pipe. As a result, tolerances within the inside diameter of the pipe are equalized by the reinforcement sleeve. Uniform reinforcement of the pipe in the entire connection region is thereby made possible.

In a further development of the invention, the width $b_{slot}$ of the axial slot of the reinforcement sleeve is calculated to be $b_{slot}=D_{sleeve}\cdot 3\%\cdot\pi$, where $D_{sleeve}$=Outside diameter of the reinforcement sleeve. As a result, maximum stability of the reinforcement sleeve, which lies against the inner wall of the pipe under a preload, is achieved. It is advantageous, in this regard, if the axially slotted reinforcement sleeve is compressed before being inserted into the pipe, to such an extent until the edges of the axial slot lie against one another.

Furthermore, a reinforcement sleeve for use in a cutting ring screw fitting of the aforementioned type, as well as in a method of the aforementioned type, having the characteristics of another aspect of the invention, is an object of the present invention. In this regard, the reinforcement sleeve has a sleeve body that is provided, on its end, with a collar that runs circumferentially at least in certain regions, and that is separated by an axial slot over its entire length. In this regard, the sleeve body is configured to be elastic to such an extent that the edges of the axial slot can be reversibly pressed against one another. Preferably, the width of the axial slot is calculated to be $b_{slot}=D_{sleeve}\cdot 3\%\cdot\pi$, where $D_{sleeve}$=outside diameter of the reinforcement sleeve. In this regard, it is advantageous if the reinforcement sleeve is produced from brass or spring steel.

BRIEF DESCRIPTION OF THE DRAWINGS

Other further developments and embodiments of the invention are indicated in the other dependent claims. An exemplary embodiment of the invention is shown in the drawings and will be described in detail below. The figures show:

DETAILED DESCRIPTION OF THE PREFERRED EMBODIMENTS

Figure 1:
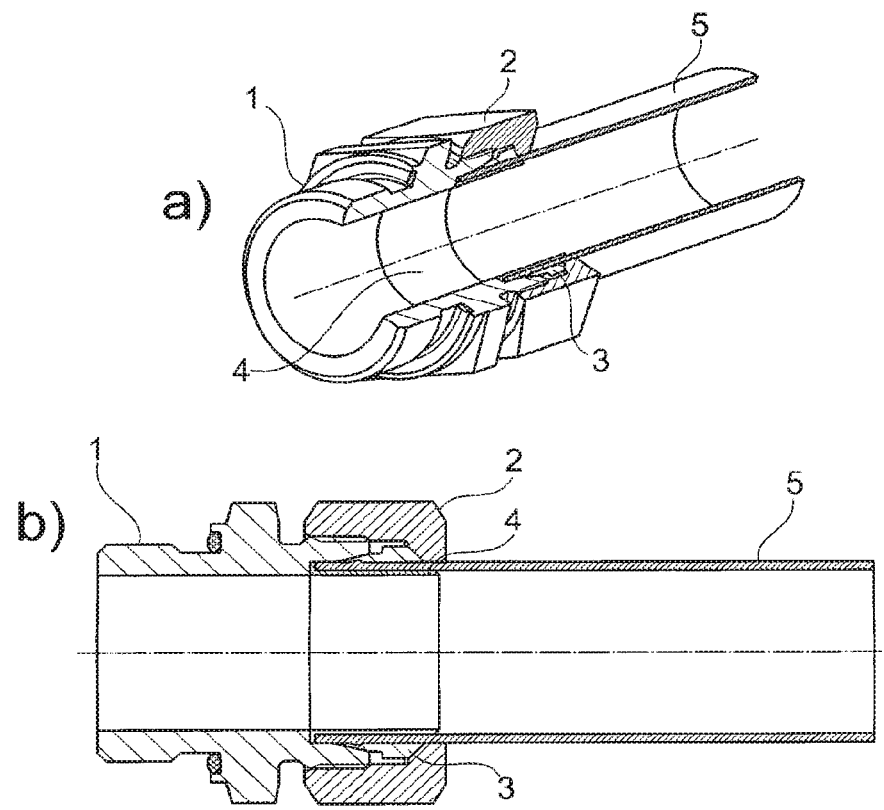
FIG. 1 the schematic representation of a thin-walled pipe provided with a cutting ring screw fitting
a) in partial section;
b) in longitudinal section.
Figure 2:
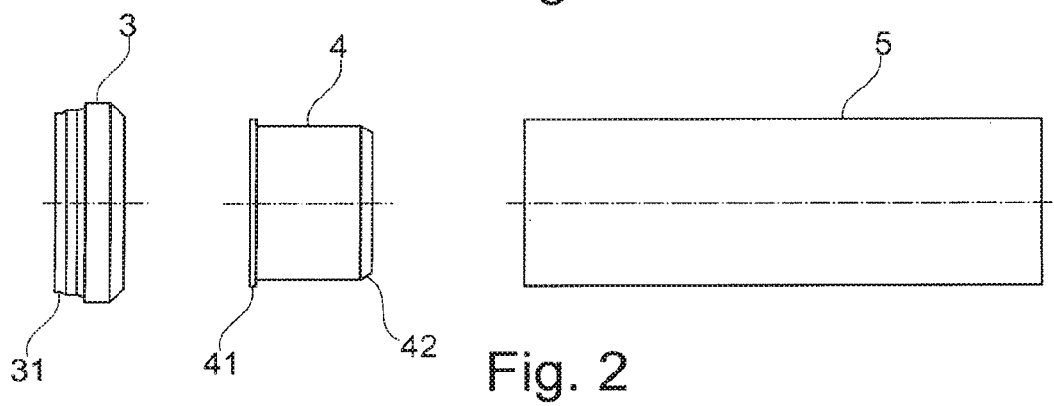
FIG. 2 the representation of the pipe with cutting ring and reinforcement sleeve from FIG. 1 in an exploded representation.
Figure 3:
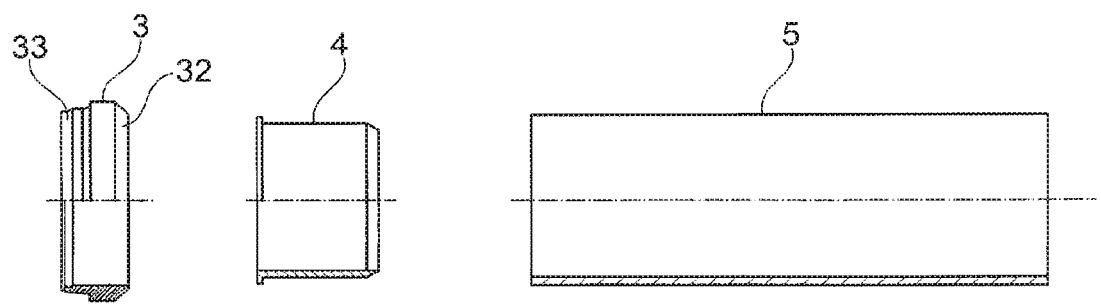
FIG. 3 the representation of the arrangement from FIG. 2 in partial section.
Figure 4:
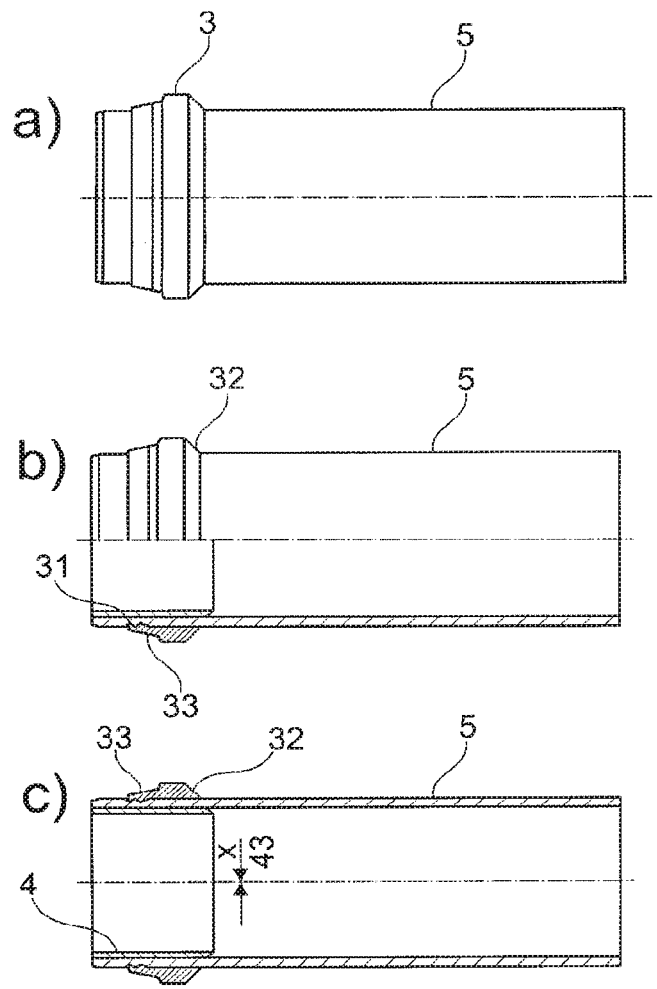
FIG. 4 the representation of the pipe section with cutting ring and reinforcement sleeve of the cutting ring screw fitting from FIG. 1 (mounted)
a) in a side view;
b) in partial section;
c) in longitudinal section.
Figure 5:
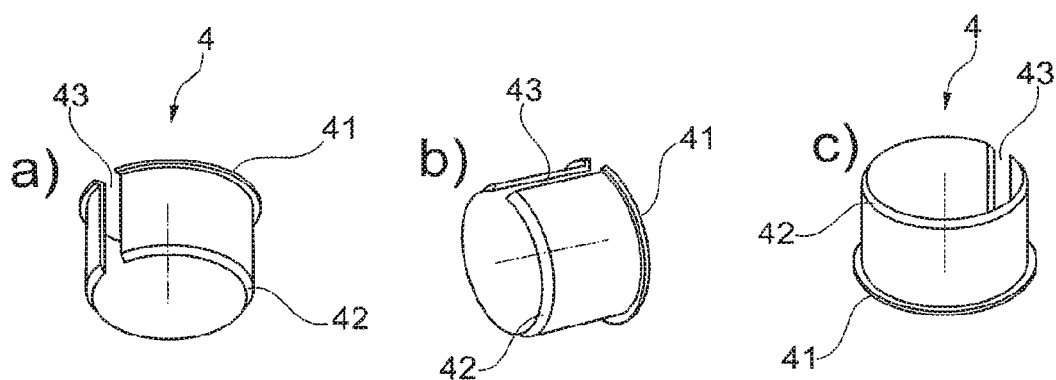
FIG. 5 the detail representation of the reinforcement sleeve of the cutting ring screw fitting according to FIG. 1
a) in a first spatial view;
b) in a second spatial view;
c) in a third spatial view.
Figure 6:
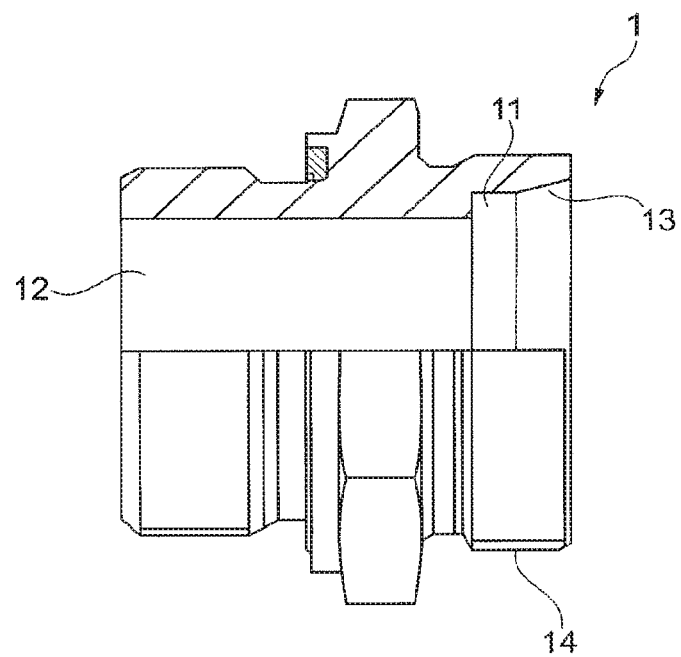
FIG. 6 the schematic representation of the connecting body of the cutting ring screw fitting from FIG. 1, and
FIG. 7 the schematic representation of the union nut of the cutting ring screw fitting from FIG. 1.
Figure 7:
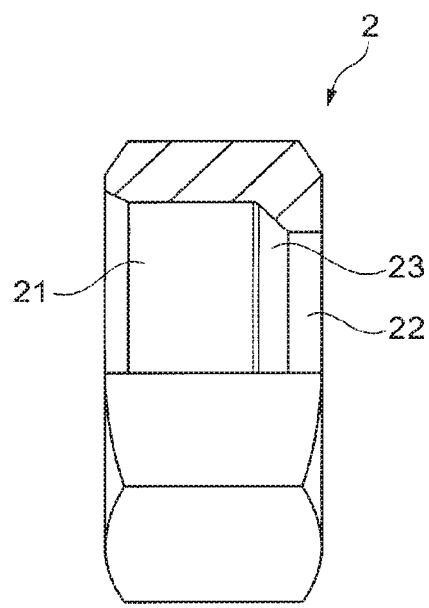

The cutting ring screw fitting for a thin-walled pipe 5, chosen as an exemplary embodiment, comprises a connecting body 1, a union nut 2 that can be screwed onto the latter, and a cutting ring 3 arranged between connecting body 1 and union nut 2, as well as a reinforcement sleeve 4 for reinforcing the pipe 5 in the connection region. In the exemplary embodiment, the pipe 5 is a welded stainless steel pipe having a nominal inside diameter of 32 mm and a wall thickness of 1.5 mm.

In known manner, the connecting body 1 has a first cylindrical bore 11, the inside diameter of which corresponds to the outside diameter of the pipe 5 to be accommodated. A second bore 12 having a smaller diameter, which essentially corresponds to the inside diameter of the pipe 5, follows the first bore 11. In the transition between the first bore 11 and the second bore 12, a step is formed for contact with the end face surface of the pipe 5. On its end opposite to the second bore 12, the first bore 11 makes a transition into a conical bore, which forms a clamping cone 13. Lying opposite to the first bore 11, the connecting body 1 furthermore has an outside thread 14 on the outside, onto which the union nut 2 can be screwed.

The union nut 2 has a radially inwardly directed collar 22 that follows its inside thread 21, the inside diameter of which collar essentially corresponds to the outside diameter of the pipe 5. In this regard, the collar 22 has a conical section 23 in the transition region to the inside thread 21.

The cutting ring 3 has two blades 31 that run radially circumferentially, each of which is radially directed in the direction of the outer surface of an accommodated pipe 5. At one end, the cutting ring 3 has a first cone 32 on the outside, to lie against the cone-shaped section 23 of the union nut 2. On its side opposite the first cone 32, the cutting ring 3 has a second cone 33 to lie against the clamping cone 13 of the connection body 1, which cone narrows outward in the direction opposite the first cone 32.

The reinforcement sleeve 4 is configured cylindrically and has an outside diameter of 33.9 mm. At one end, a collar that projects radially outward is formed circumferentially onto the reinforcement sleeve 4, the width of which collar essentially corresponds to the wall thickness of the pipe 5 of 1.5 mm. On its side that lies opposite the collar 41, the reinforcement sleeve 4 has a cone-shaped end section 42. Over its entire length, the reinforcement sleeve 4 is furthermore provided with an axial slot 43. In the exemplary embodiment, the axial slot 43 has a width of 3 mm.

For mounting the cutting ring screw fitting, first the axially slotted reinforcement sleeve 4 is compressed until the edges of the axial slot 43 lie against one another, and it is inserted into the pipe 5 in this preloaded state, until the pipe lies against the collar 41 of the reinforcement sleeve 4, which relaxes within the pipe 5 so that is lies against the inner wall of the pipe 5 circumferentially, due to the preload force. Existing inside diameter tolerances of the pipe are thereby equalized. Subsequently, the union nut, the cutting ring, and the connecting body are set onto the pipe 5, until the collar 41 of the reinforcement sleeve 4, arranged on the end side in the pipe 5, lies against the step formed between the first bore 11 and the second bore 12 of the connecting body 1. Subsequently, the union nut 2 is screwed onto the outside thread 14 of the connecting body 1 with its inside thread 31, and thereby the cutting ring 3, arranged between connecting body 1 and union nut 2, is pressed into the clamping cone 13 of the connecting body 1. As a result, the cutting ring 3 is narrowed in its front part, and thereby it cuts into the outer mantle of the pipe 5 with its blades 31. Due to the reinforcement sleeve 4 arranged in the connecting region of the pipe 5, the forces that thereby act radially on the pipe 5 are additionally absorbed, and thereby deformation of the thin-walled pipe 5 is effectively counteracted. In this regard, the reinforcement sleeve is given stability, for one thing, in that the sides of the slot 43 press against one another; alternatively—in the presence of greater tolerances—the required counter-holding force is generated by the friction forces between the outer mantle surface of the reinforcement sleeve 4 and the inner mantle surface of the pipe 5.

The invention claimed is:

1. An assembly comprising a thin-walled pipe and a cutting ring screw fitting for the thin-walled pipe, the cutting ring screw fitting comprising:
   a connecting body that has a clamping cone;
   a cutting ring;
   a union nut that can be screwed onto the connecting body; and
   a reinforcement sleeve for introduction into the pipe;
   wherein the reinforcement sleeve has an axial slot;
   wherein the outside diameter of the reinforcement sleeve is greater than the inside diameter of the pipe;
   wherein a reduction of the outside diameter of the reinforcement sleeve to a diameter that is less than the inside diameter of the pipe is made possible by compressing the edges of the axial slot; and
   wherein the axial slot runs over the entire length of the reinforcement sleeve.

2. The assembly according to claim 1, wherein the outside diameter of the reinforcement sleeve amounts to at least 1.02 times a nominal inside diameter of the pipe.

3. The assembly according to claim 1, wherein the width $b_{slot}$ of the axial slot is calculated to be $$b_{slot} = D_{sleeve} \cdot 3\% \cdot \pi$$

where $D_{sleeve}$=outside diameter of the reinforcement sleeve.

4. The assembly according to claim 1, wherein an end of the reinforcement sleeve is provided with a collar that runs around the circumference, at least in certain regions, so as to lie against the pipe.

5. The assembly according to claim 1, wherein the reinforcement sleeve has a cone-shaped end section at one end.

6. The assembly according to claim 1, wherein the outside diameter of the reinforcement sleeve amounts to at least 1.03 times a nominal inside diameter of the pipe.

7. The assembly according to claim 1, wherein the outside diameter of the reinforcement sleeve amounts to at least 1.04 times a nominal inside diameter of the pipe.

8. A pipe comprising:
   an inner wall defining an inside diameter of the pipe;
   an outer wall; and
   a cutting ring screw fitting comprising:
      a connecting body that has a clamping cone;
      a cutting ring having blades;
      a union nut that can be screwed onto the connecting body; and
      a reinforcement sleeve lying against the inner wall of the pipe under a preload and having a total length and an axial slot extending over the total length of the reinforcement sleeve, the axial slot having edges;
   wherein the reinforcement sleeve has an outside diameter greater than the inside diameter of the pipe;
   wherein a reduction of the outside diameter of the reinforcement sleeve to a diameter that is less than the inside diameter of the pipe is made possible by compressing the edges of the axial slot; and
   wherein the cutting ring lies against the clamping cone of the connecting body and is pressed onto the outer wall of the pipe by way of the screw connection of the connecting body and the union nut, in such a manner that the blades of the ring cut into the outer wall of the pipe.

9. The pipe according to claim 8,
   wherein the inside diameter of the pipe lies in a selected range of tolerance of a nominal inside diameter of the pipe; and
   wherein the width $b_{slot}$ of the axial slot of the reinforcement sleeve is calculated to be $$b_{slot} = D_{sleeve} \cdot 3\% \cdot \pi$$

where $D_{sleeve}$=outside diameter of the reinforcement sleeve.

* * * * *